United States Patent
Cha et al.

(10) Patent No.: US 10,225,704 B2
(45) Date of Patent: Mar. 5, 2019

(54) MOBILE COMMUNICATION TERMINAL AND METHOD OF RECOMMENDING APPLICATION OR CONTENT

(75) Inventors: Sang-ok Cha, Daegu (KR); Dong-woo Kim, Daegu (KR); Young-ri Kim, Suwon-si (KR); Ji-yeon Yoo, Yongin-si (KR); Ju-youn Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/610,154

(22) Filed: Sep. 11, 2012

(65) Prior Publication Data
US 2013/0252637 A1 Sep. 26, 2013

(30) Foreign Application Priority Data
Mar. 21, 2012 (KR) .................. 10-2012-0028964

(51) Int. Cl.
*H04W 4/21* (2018.01)
*H04W 4/021* (2018.01)
(Continued)

(52) U.S. Cl.
CPC .............. *H04W 4/21* (2018.02); *H04L 67/18* (2013.01); *H04M 1/72527* (2013.01);
(Continued)

(58) Field of Classification Search
CPC ......... H04W 4/02; H04W 4/20; H04W 4/206; H04W 4/021; H04W 4/21; H04W 4/001;
(Continued)

(56) References Cited

U.S. PATENT DOCUMENTS

| 5,390,238 | A | 2/1995 | Kirk et al. |
| 8,736,585 | B2 | 5/2014 | Omata et al. |

(Continued)

FOREIGN PATENT DOCUMENTS

| EP | 2397979 A1 | 12/2011 |
| EP | 2410482 A1 | 1/2012 |

(Continued)

OTHER PUBLICATIONS

International Search Report dated Jun. 24, 2013, issued by the International Searching Authority in counterpart International Application No. PCT/KR2013/002359.

(Continued)

*Primary Examiner* — George Eng
*Assistant Examiner* — Hung K Du
(74) *Attorney, Agent, or Firm* — Sughrue Mion, PLLC

(57) ABSTRACT

A mobile communication terminal and a method of recommending an application or content by providing information regarding a terminal status obtained by the mobile communication terminal when a connection device is connected to the mobile communication terminal without having to look for the application or content. The mobile communication terminal includes a connection status determining unit which determines a connection status of a connection device and the mobile communication terminal, a terminal status storage unit which stores information regarding a terminal status of the mobile communication terminal; and a recommended target executing unit which determines a recommended application based on the connection status and the information regarding the terminal status of the mobile communication terminal.

18 Claims, 7 Drawing Sheets

(51) Int. Cl.
  *H04M 1/725* (2006.01)
  *H04W 4/02* (2018.01)
  *H04L 29/08* (2006.01)
(52) U.S. Cl.
  CPC ... *H04M 1/72569* (2013.01); *H04M 1/72572* (2013.01); *H04W 4/02* (2013.01); *H04W 4/021* (2013.01); *H04M 2250/12* (2013.01)
(58) Field of Classification Search
  CPC ......... H04M 1/72569; H04M 1/72527; H04M 1/72572; H04M 2250/12; H04M 1/72563; H04L 67/18; H04L 67/00; H04L 67/22; H04L 67/30
  USPC ............................................ 455/456.1, 456.3
  See application file for complete search history.

(56) References Cited

U.S. PATENT DOCUMENTS

| | | | |
|---|---|---|---|
| 2006/0055683 A1* | 3/2006 | Wouters | 345/179 |
| 2006/0276919 A1 | 12/2006 | Shirai et al. | |
| 2007/0099602 A1 | 5/2007 | Kurlander et al. | |
| 2008/0042990 A1 | 2/2008 | Ma | |
| 2009/0099820 A1 | 4/2009 | Kaplan | |
| 2010/0005045 A1 | 1/2010 | Hiraoka et al. | |
| 2010/0207897 A1 | 8/2010 | Ono | |
| 2010/0257251 A1* | 10/2010 | Mooring | H04W 4/206 709/216 |
| 2011/0230209 A1 | 9/2011 | Kilian | |
| 2011/0303741 A1* | 12/2011 | Bolton et al. | 235/375 |
| 2012/0021774 A1* | 1/2012 | Mehta et al. | 455/456.3 |
| 2012/0059780 A1 | 3/2012 | Kononen et al. | |
| 2012/0143791 A1* | 6/2012 | Sathish | H04L 67/30 706/12 |
| 2012/0151102 A1* | 6/2012 | Cheng | G06F 13/102 710/19 |
| 2013/0014040 A1* | 1/2013 | Jagannathan et al. | 715/765 |

FOREIGN PATENT DOCUMENTS

| | | |
|---|---|---|
| JP | 8-255044 A | 10/1996 |
| JP | 10-143269 A | 5/1998 |
| JP | 2004-274494 A | 9/2004 |
| JP | 2007-104464 A | 4/2007 |
| JP | 2007-115045 A | 5/2007 |
| JP | 2008-204330 A | 9/2008 |
| JP | 2009-54478 A | 3/2009 |
| JP | 2009-145785 A | 7/2009 |
| JP | 2010-16443 A | 1/2010 |
| KR | 10-2007-0016330 A | 2/2007 |
| KR | 10-2007-0056673 A | 6/2007 |
| KR | 100830678 B1 | 5/2008 |
| WO | 2004010272 A2 | 1/2004 |
| WO | 2009054478 A1 | 4/2009 |
| WO | 2010133770 A1 | 11/2010 |
| WO | 2011159534 A1 | 12/2011 |

OTHER PUBLICATIONS

Written Opinion dated Jun. 24, 2013, issued by the International Searching Authority in counterpart International Application No. PCT/KR2013/002359.
Communication dated Apr. 11, 2016, issued by the Japanese Patent Office in counterpart Japanese Application No. 2014-552139.
Communication dated May 18, 2016, issued by the Federal Service on Intellectual Property in counterpart Russian Application No. 2014142273.
Communication dated Oct. 16, 2017, issued by the Japanese Patent Office in counterpart Japanese Application No. 2016-158497.
Communication from the Australian Patent Office dated Apr. 24, 2015 in a counterpart Australian Application No. 2013235923, 3 pages.
Office Action dated Jul. 17, 2015 by the Japanese Patent Office in counterpart Japanese Patent Application No. 2014-552139.
Communication dated Apr. 30, 2018, issued by the Korean Intellectual Property Office in counterpart Korean Application No. 10-2012-0028964.
Communication dated Nov. 5, 2015 by the European Patent Office in related Application No. 13764491.0.
Communication dated Dec. 28, 2015 by the Russian Patent Office in related Application No. 2014142273/08(068382).

* cited by examiner

FIG. 3

| TERMINAL STATUS / TIME | LOCATION | RECOGNITION OF MOTION | IMAGE INFORMATION | SOUND INFORMATION | TEMPERATURE | ... | EXECUTED APPLICATION | EXECUTED CONTENT |
|---|---|---|---|---|---|---|---|---|
| 1 | (xx, xx) | XYZ | | | 25°C | ... | A | |
| 2 | (12, 34) | AC | | AB | 18°C | | | X |
| 3 | (xx, xx) | XYZ | | | 25°C | ... | A | |
| 4 | (45, 67) | AC | | CD | 30°C | | B | |
| 5 | (xx, xx) | XYZ | | | 25°C | | A | |
| ... | ... | ... | ... | ... | ... | | ... | ... |

(600)　　　　　(610)　　　　　(620)

(700)　　　　　(710)　　　　　(720)

(800)　　　　　(810)　　　　　(820)

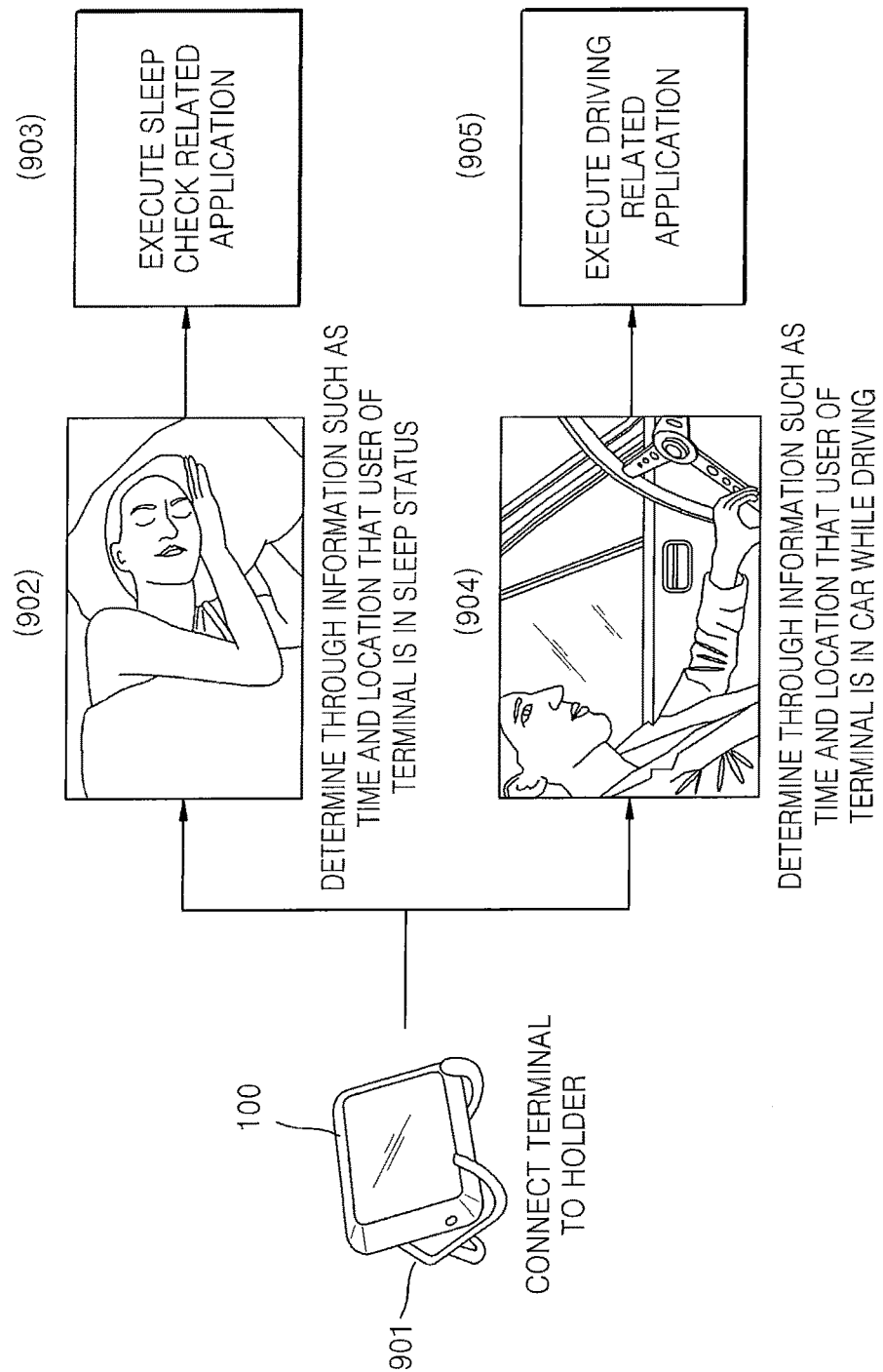

MOBILE COMMUNICATION TERMINAL AND METHOD OF RECOMMENDING APPLICATION OR CONTENT

CROSS-REFERENCE TO RELATED APPLICATION

This application claims priority from Korean Patent Application No. 10-2012-0028964, filed on Mar. 21, 2012, in the Korean Intellectual Property Office, the disclosure of which is incorporated herein in its entirety by reference.

BACKGROUND

1. Field

Apparatuses and methods consistent with exemplary embodiments relate to a mobile communication terminal and a method of recommending content or an application to a user, and more particularly, to a mobile communication terminal and a method of selecting and recommending content or an application by using information regarding a connection status of a connection device and the mobile communication terminal, and a terminal status of the mobile communication terminal collected by the mobile communication terminal.

2. Description of the Related Art

In the related art, to connect and use mobile communication terminals and connection devices, users connect mobile communication terminals and connection devices, execute applications to use connection devices connected to mobile communication terminals, and apply settings for the use of connection devices by using the executed applications.

Users also personally search for applications or content to use connection devices after applying settings. Thus, users are inconveniently required to carry out additional operations after connecting connection devices to mobile communication terminals in order to use the connection devices.

Furthermore, if users use the connection devices by using applications, mobile communication terminals conventionally do not effectively utilize information regarding terminal statuses obtained by using connection devices connected to mobile communication terminals.

Therefore, mobile communication terminals or methods of effectively recommending applications or content by using connection statuses of connection devices and statuses of mobile communication terminals, when connection devices are connected to mobile communication terminals, are needed.

SUMMARY

Exemplary embodiments provide a mobile communication terminal and a method of recommending an application or content to provide a platform capable of selecting and executing the application or content with respect to a connection device connected to the mobile communication terminal.

According to an aspect of an exemplary embodiment, there is provided a mobile communication terminal for recommending an application, the mobile communication terminal including a connection status determining unit which determines a connection status of a connection device and the mobile communication terminal, a terminal status storage unit which stores information regarding a terminal status of the mobile communication terminal; and a recommended target executing unit which determines a recommended application based on the connection status and the information regarding the terminal status of the mobile communication terminal, wherein the information regarding the terminal status of the mobile communication terminal includes at least one of information regarding a movement of the mobile communication terminal and information regarding an environment of a location where the mobile communication terminal is located, and wherein the recommended target executing unit accumulates and stores the information regarding the terminal status of the mobile communication terminal and determines and executes the recommended application based on the accumulated and stored information.

The recommended target executing unit may determine and execute the recommended application based on the determined connection status as the connection device is connected to the mobile communication terminal.

The connection status may include at least one of whether the mobile communication terminal and the connection device are connected to each other, a type of the connection device connected to the mobile communication terminal, and a connection method connecting the mobile communication terminal with the connection device.

The terminal status storage unit may confirm and store the terminal status of the mobile communication terminal by using at least one of a movement recognition sensor, an image sensor, a sound sensor, a touch sensor, a temperature sensor, a gravity sensor, and a location sensor. The information regarding the terminal status includes at least one of a current time, an image received by the mobile communication terminal through the image sensor, a temperature of the mobile communication terminal measured through the temperature sensor, sound received by the mobile communication terminal, information regarding a location of the mobile communication terminal, illumination of the location of the mobile communication terminal, an angle formed between the mobile communication terminal and a horizontal plane, an application currently being used in the mobile communication terminal, a current status of the mobile communication terminal being used, and user information.

The recommended target executing unit may provide a server with the connection status and the information regarding the terminal status, receive recommended application identification information from the server, and determine the recommended application. The recommended target executing unit may provide the server with a list of applications installed in the mobile communication terminal, and the recommended application includes at least one of the applications included in the list.

The connection device and the mobile communication terminal may be connected to each other through a wireless communication.

In a case where the connection status and the information regarding the terminal status of the mobile communication terminal correspond to a plurality of recommended applications, the recommended target executing unit may output a list of the plurality of recommended applications, receive a user's selection from the output list of the plurality of recommended applications, and determine the recommended application.

According to an aspect of another exemplary embodiment, there is provided a method of recommending an application in a mobile communication terminal, the method including obtaining information regarding a terminal status of the mobile communication terminal, accumulating and storing the information regarding the terminal status of the mobile communication terminal, determining a connection status of a connection device and the mobile communication terminal, and determining and executing a recommended application based on the connection status and the accumulated and stored information regarding the terminal status of the mobile communication terminal, wherein the information regarding the terminal status of the mobile communication terminal includes at least one of information regarding a movement of the mobile communication terminal and information regarding an environment of a location where the mobile communication terminal is located.

According to another aspect of an exemplary embodiment, there is provided a mobile communication terminal for recommending content, the mobile communication terminal including a connection status determining unit which determines a connection status of a connection device and the mobile communication terminal, a terminal status storage unit which obtains and stores information regarding a terminal status of the mobile communication terminal, and a recommended target executing unit which determines recommended content corresponding to the connection status and the information regarding the terminal status of the mobile communication terminal, executing an application corresponding to the determined recommended content, and executing the determined recommended content based on the executed application, wherein the information regarding the terminal status of the mobile communication terminal includes at least one of information regarding a movement of the mobile communication terminal and information regarding an environment of a location where the mobile communication terminal is located, wherein the terminal status storage unit accumulates and stores the information regarding the terminal status of the mobile communication terminal, and the recommended target executing unit determines and executes the recommended content based on the accumulated and stored information.

According to an aspect of another exemplary embodiment, there is provided a method of recommending content in a mobile communication terminal, the method including obtaining information regarding a terminal status of the mobile communication terminal, accumulating and storing the information regarding the terminal status of the mobile communication terminal, determining a connection status of a connection device and the mobile communication terminal, determining recommended content based on the connection status and the accumulated and stored information regarding the terminal status of the mobile communication terminal, and executing an application corresponding to the determined recommended content and executing the determined recommended content based on the executed application, wherein the information regarding the terminal status of the mobile communication terminal includes at least one of information regarding a movement of the mobile communication terminal and information regarding an environment of a location where the mobile communication terminal is located.

BRIEF DESCRIPTION OF THE DRAWINGS

The above and other aspects will become more apparent by describing in detail exemplary embodiments with reference to the attached drawings in which:

FIG. 3 is a table illustrating accumulated and stored information regarding an application or content executed corresponding to information regarding a connection status of a connection device or a terminal status of a mobile communication terminal, according to an exemplary embodiment;

FIG. 9 illustrates an example of executing a recommended application when a mobile communication terminal is connected to a holder.

DETAILED DESCRIPTION

Figure 1:
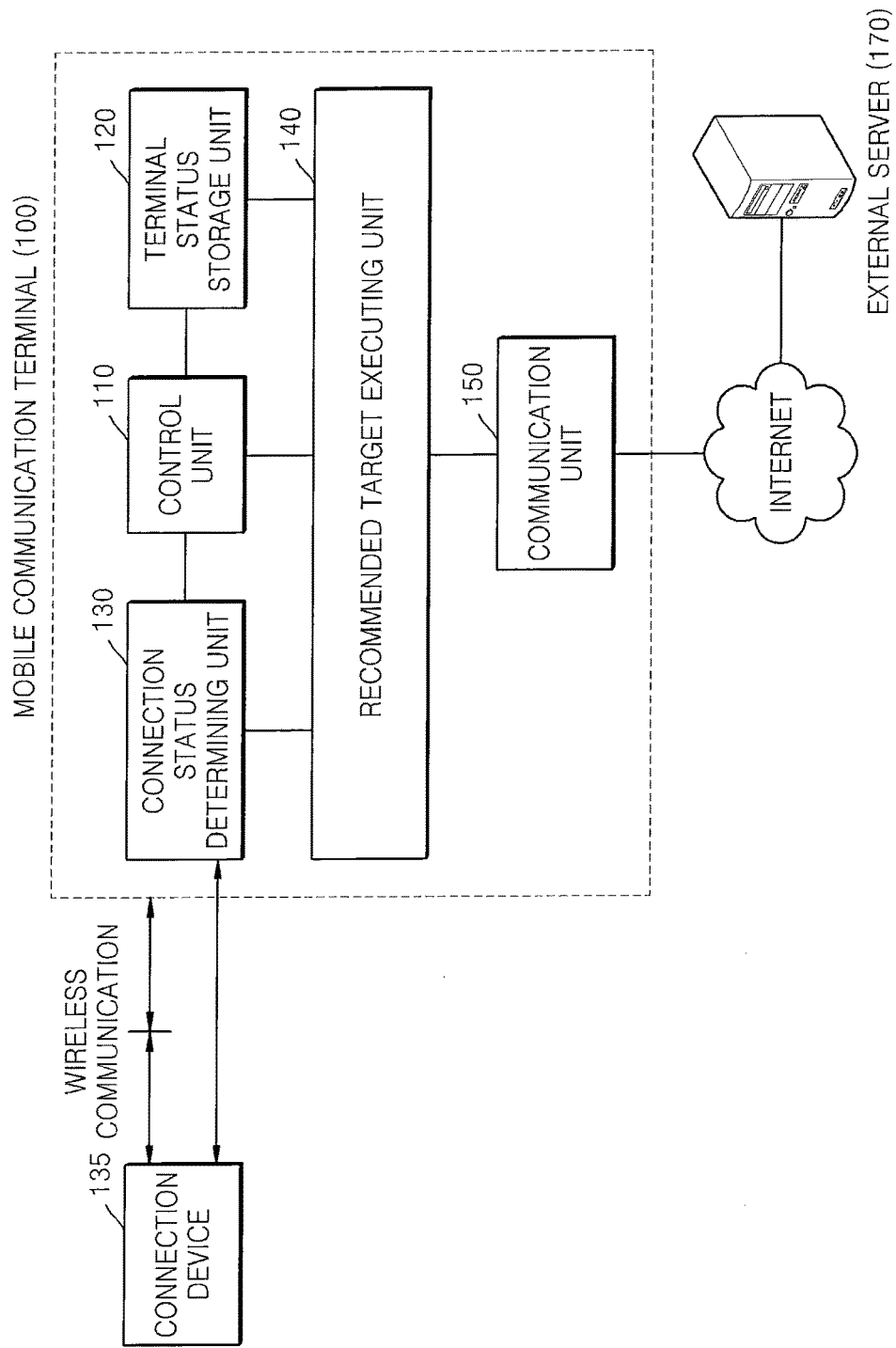
FIG. 1 is a block diagram of a system including a mobile communication terminal for recommending and executing an application or content when a connection device is connected to the mobile communication terminal, according to an exemplary embodiment.

Hereinafter, exemplary embodiments will be described in greater detail with reference to the accompanying drawings so that those of ordinary skill in the art can accomplish the exemplary embodiments. The exemplary embodiments may, however, be embodied in many different forms and should not be construed as being limited to the embodiments set forth herein. In the following description, well-known functions or constructions are not described in detail since they would obscure the exemplary embodiments with unnecessary detail. Throughout the drawings, whenever the same element reappears in a subsequent drawing, it is denoted by the same reference numeral.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Expressions such as "at least one of," when preceding a list of elements, modify the entire list of elements and do not modify the individual elements of the list.

The exemplary embodiments will now be described more fully with reference to the accompanying drawings FIG. 1 is a block diagram of a system including a mobile communication terminal 100 for recommending and executing an application or content when a connection device 135 is connected to the mobile communication terminal 100, according to an exemplary embodiment. In FIG. 1, the system is configured to determine and execute a recommendation regarding the application or content included in the mobile communication terminal 100 based on information regarding a connection status of the connection device 135 and a terminal status of the mobile communication terminal 100.

A terminal status storage unit 120 may obtain and store information regarding an application or content that is executed in the mobile communication terminal 100. The application may reside in a memory embedded in the mobile communication terminal 100 and may be executed in the mobile communication terminal 100.

The terminal status may be information regarding a status of the mobile communication terminal 100 or information on an environment and surroundings of the mobile communication terminal 100.

The information regarding the terminal status of the mobile communication terminal 100 or information on the environment and surroundings of the mobile communication terminal 100 may include metadata of a used application or content. The metadata may include one or more pieces of information regarding a time at which the application or content is used, a user's preference for the application or content, frequency of use of the application or content, and content sharing with other users.

Also, the information regarding the terminal status of the mobile communication terminal 100 or information on the environment and surroundings of the mobile communication terminal 100 may include one or more pieces of location information regarding a location of the mobile communication terminal 100, recognition information regarding a physical movement of the mobile communication terminal 100, sound input information, temperature information, image information, illumination information, and information regarding a horizontal angle and atmospheric pressure of the mobile communication terminal 100.

The location information may include information indicating the location of the mobile communication terminal 100, such as cell-ID information, Wi-Fi access point (AP) information, and global positioning system (GPS) coordinate information.

The recognition information regarding the physical movement of the mobile communication terminal 100 may include information regarding a movement of the mobile communication terminal 100, such as shaking, vibration, etc., which is recognized by using a gravity sensor, an acceleration sensor, etc. that is embedded in the mobile communication terminal 100.

The sound input information may include information regarding sound from surroundings of the mobile communication terminal 100, which is received using a microphone, etc.

The temperature information may include information regarding a temperature that may be sensed by the mobile communication terminal 100 by using a temperature sensor embedded in the mobile communication terminal 100.

The image information may include information regarding an image captured using a camera embedded in the mobile communication terminal 100.

The illumination information may include information regarding the illumination of light from surroundings of the mobile communication terminal 100, which is sensed using the camera or an illumination sensor embedded in the mobile communication terminal 100.

The horizontal angle of the mobile communication terminal 100 means an angle formed between the mobile communication terminal 100 and a horizontal plane.

The information regarding the atmospheric pressure may include information regarding an atmospheric pressure of surroundings of the mobile communication terminal 100, which is measured by the mobile communication terminal 100.

To obtain the information described above, the terminal status storage unit 120 may include at least one of an acceleration sensor, an image sensor, a sound sensor, a temperature sensor, a gravity sensor, a location sensor, and a barometer.

Furthermore, the information regarding the terminal status of the mobile communication terminal 100 or information on the environment and surroundings of the mobile communication terminal 100 may include information regarding an application or content that is being currently used in the mobile communication terminal 100.

The information regarding the terminal status of the mobile communication terminal 100 or information on the environment and surroundings of the mobile communication terminal 100 may also include information regarding settings of the mobile communication terminal 100. For example, the information may include information regarding settings of the mobile communication terminal 100, such as a sleep mode to minimize use of a processor of the mobile communication terminal 100 and reduce power consumption of the mobile communication terminal 100, or an input mode of a keypad.

The information regarding the terminal status of the mobile communication terminal 100 or information on the environment and surroundings of the mobile communication terminal 100 may also include information regarding a user of the mobile communication terminal 100, such as the user's age, sex, job, etc.

In a case where a recommended target executing unit 140 requests information regarding the terminal status stored in the terminal status storage unit 120 in order to determine an application or content corresponding to the connection device 135, the terminal status storage unit 120 may provide the recommended target executing unit 140 with the requested information.

In an exemplary embodiment, the terminal status storage unit 120 may accumulate and store the information regarding the terminal status. The recommended target executing unit 140 may use the information regarding the terminal status that is accumulated and stored in the terminal status storage unit 120 as information used to determine the application or content corresponding to the connection device 135. For example, in a case where the mobile communication terminal 100 is located in a library or a school, earphones are connected thereto, and an application or content relating to education is repeatedly executed using the mobile communication terminal 100. Information regarding the executed application or content may be accumulated and stored in the terminal status storage unit 120.

The information regarding the executed application or content may include a type of the executed application or content, a time at which the application or content is executed, and information regarding the terminal status of the mobile communication terminal 100 at the time at which the application or content is executed.

For example, the mobile communication terminal 100 may use the accumulated and stored information to execute the application or content relating to education if the earphones are connected to the mobile communication terminal 100 in a library or a school in the future.

A connection status determining unit 130 determines the connection status of the mobile communication terminal 100 and the connection device 135. The connection status of the mobile communication terminal 100 and the connection device 135 may include at least one of information regarding whether the mobile communication terminal 100 and the connection device 135 are connected to each other, information regarding a type of the connection device 135 connected to the mobile communication terminal 100, and information regarding a connection method connecting the mobile communication terminal 100 and the connection device 135.

The information regarding whether the mobile communication terminal 100 and the connection device 135 are connected to each other may be sensed and generated by the connection status determining unit 130.

In a case where the connection status determining unit 130 determines whether the mobile communication terminal 100 and the connection device 135 are connected to each other or are disconnected from each other, the connection status determining unit 130 may renew the connection status of the connection device 135 and provide the recommended target executing unit 140 with information regarding the connection status.

The connection device 135 connected to the mobile communication terminal 100 does not have to be a type which operates independently from the mobile communication terminal 100. For example, connection device 135 may include an electronic pen that may be used as an input device of the mobile communication terminal 100, earphones, an antenna embedded in or externally connected to the mobile communication terminal 100, a holder of the mobile communication terminal 100, a wrist watch, and a device connected through a cable such as a universal serial bus (USB).

The information regarding the connection method of the mobile communication terminal 100 and the connection device 135 may include information regarding whether the connection device 135 is connected to the mobile communication terminal 100 by wire or wirelessly. For example, in a case where the connection device 135 is connected to the mobile communication terminal 100 by wire, the information regarding whether the connection device 135 is connected to the mobile communication terminal 100 by wire or wirelessly may include information regarding a part of the mobile communication terminal 100 to which the connection device 135 is connected. For example, the information regarding whether the connection device 135 is connected to the mobile communication terminal 100 by wire or wirelessly may include information regarding whether the connection device 135 is connected to an earphone plug socket of the mobile communication terminal 100 or is connected to the mobile communication terminal 100 through a cable.

Also, in a case where the connection device 135 is connected to the mobile communication terminal 100 wirelessly, the information regarding whether the connection device 135 is connected to the mobile communication terminal 100 by wire or wirelessly may include information regarding a wireless communication method by which the connection device 135 is connected to the mobile communication terminal 100. For example, the information regarding whether the connection device 135 is connected to the mobile communication terminal 100 by wire or wirelessly may include information regarding a wireless communication method, such as Bluetooth, Zigbee, or near field communication (NFC), by which the connection device 135 is connected to the mobile communication terminal 100.

The recommended target executing unit 140 may receive the information regarding the connection status of the connection device 135 from the connection status determining unit 130 and determine the application or content corresponding to the connection device 135. In this regard, the recommended target executing unit 140 may determine the application or content by using the information regarding the terminal status received from the terminal status storage unit 120. For example, in a case where the mobile communication terminal 100 is connected to earphones corresponding to the connection device 135, if there is no information regarding the terminal status, the recommended target executing unit 140 may execute an application relating to music, and, if a motion of the user who is jogging is recognized, the recommended target executing unit 140 may execute an application relating to exercise.

In a case where the recommended target executing unit 140 determines to execute the application corresponding to the connection device 135, the recommended target executing unit 140 executes the application. In a case where the recommended target executing unit 140 determines to execute the content corresponding to the connection device 135, the recommended target executing unit 140 may execute the determined content based on the executed application.

According to another exemplary embodiment, the recommended target executing unit 140 may execute an application for editing a photo captured by using a photo capture application if an electronic pen is taken out of the mobile communication terminal 100.

According to another exemplary embodiment, the recommended target executing unit 140 may convert a text input mode of the mobile communication terminal 100 into a cursive recognition mode in which an electronic pen is used to input text by using a keypad, if the electronic pen is taken out of the mobile communication terminal 100.

According to another exemplary embodiment, if the electronic pen is taken out in the sleep mode, a most frequently used memo application may be executed.

According to another embodiment, if the user connects the earphones to the mobile communication terminal 100 and starts running, an application relating to exercise or music may be executed through a movement recognition of the mobile communication terminal 100.

According to another exemplary embodiment, if an antenna which is embedded in the mobile communication terminal 100 is extended, content relating to digital multimedia broadcasting (DMB) may be executed, and newly updated content or frequently used content may be recommended.

According to another exemplary embodiment, in a case where a computer is connected to the mobile communication terminal 100 through a USB cable, if the computer is at a home, the computer may be synchronized with a personal server and cloud, and, if the computer is in an office, the computer may be synchronized with an office server and cloud.

According to another exemplary embodiment, in a case where the mobile communication terminal 100 is connected to a holder, a sleep status of the mobile communication terminal 100 may be determined by using the location information of the mobile communication terminal 100, the movement recognition of the mobile communication terminal 100, a current time, etc., and an application for inspecting the sleep state of the user may be executed. In a case where the user drives a car while connecting the mobile communication terminal 100 to a holder in the car, a car driving status of the mobile communication terminal 100 may be determined and content relating to driving may be provided.

According to another exemplary embodiment, in a case where the mobile communication terminal 100 is connected to a wrist watch, a schedule management application may be executed. Also, in a case where the user runs by connecting the wrist watch to the mobile communication terminal 100, an application relating to exercise may be executed.

According to another exemplary embodiment, in a case where the user of the mobile communication terminal 100 rides in the car while carrying the mobile communication terminal 100, a car riding status may be recognized through the NFC between the mobile communication terminal 100 and the car, and content relating to driving may be provided.

According to another exemplary embodiment, the recommended target executing unit 140 may determine the application or content by using the terminal status accumulated and stored in the terminal status storage unit 120. That is, if there is an application or content that is repeatedly used with respect to a connection specific status of a connection device and a specific status of a terminal, the recommended target executing unit 140 may determine to execute the repeatedly used application or content in the status of the specific terminal when the connection device is connected to the terminal.

According to another exemplary embodiment, the recommended target executing unit 140 may transmit the connection status of the mobile communication terminal 100 and the connection device 135 and the terminal status of the mobile communication terminal 100 to an external server 170 over a communication network, receive information regarding a recommended application or content from the external server 170, and determine a recommended application or content. Also, the recommended target executing unit 140 may transmit a list of applications installed in the mobile communication terminal 100 and content embedded in the mobile communication terminal 100 to the external server 170, together with the connection status of the mobile communication terminal 100 and the connection device 135 and the terminal status of the mobile communication terminal 100.

A communication unit 150 may transmit and receive information between the mobile communication terminal 100 and the external server 170 over the communication network. The communication network may be a communication network used to transmit and receive data between devices, such as the Internet, NFC, a mobile communication network, etc.

The terminal status storage unit 120 may store the obtained list of applications installed in the mobile communication terminal 100 and content embedded in the mobile communication terminal 100.

The external server 170 may receive the connection status of the mobile communication terminal 100 and the connection device 135 and the terminal status of the mobile communication terminal 100 through the communication unit 150 of the mobile communication terminal 100. Also, the external server 170 may determine the recommended application or content by using the received connection status of the mobile communication terminal 100 and the connection device 135 and terminal status of the mobile communication terminal 100, and transmit information regarding the recommended application or content to the mobile communication terminal 100. In this regard, in a case where the external server 170 receives the list of applications installed in the mobile communication terminal 100 and content embedded in the mobile communication terminal 100, the external sever 170 may determine the recommended application or content among applications or content included in the received list.

According to another exemplary embodiment, in a case where the recommended target executing unit 140 determines a plurality of recommendations, the recommended target executing unit 140 may output a list of the plurality of recommendations, receive a user's selection of an application or content to be executed from the list of the plurality of recommendations, and execute the application or content.

A control unit 110 controls each element of the mobile communication terminal 100.

Figure 2:
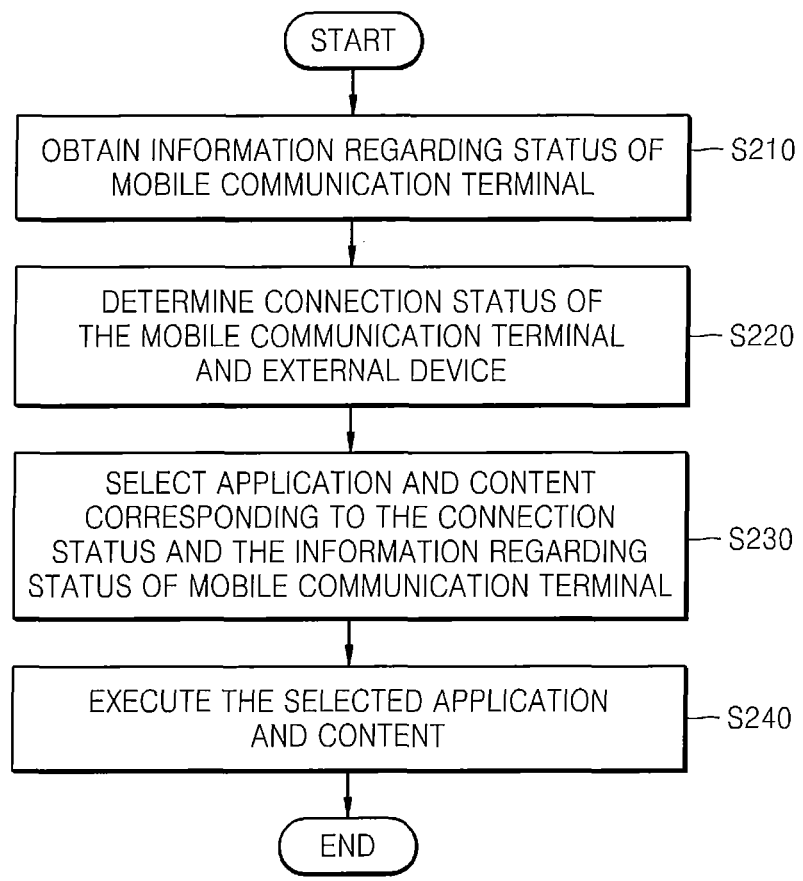
FIG. 2 is a flowchart illustrating a method of recommending and executing an application or content when a connection device is connected to a mobile communication terminal, according to an exemplary embodiment.

FIG. 2 is a flowchart illustrating a method of recommending and executing an application or content when the connection device 135 is connected to the mobile communication terminal 100, according to an exemplary embodiment. The method of recommending and executing the application or content when the connection device 135 is connected to the mobile communication terminal 100 according to the exemplary embodiment may be performed by the mobile communication terminal 100 described with reference to FIG. 1.

The mobile communication terminal 100 obtains information regarding a terminal status (operation S210). The information regarding the terminal status may be information regarding a status of the mobile communication terminal 100 or information on an environment and surroundings of the mobile communication terminal 100.

The information regarding the status of the mobile communication terminal 100 or information on the environment and surroundings of the mobile communication terminal 100 may include metadata of a used application or content. The metadata may include one or more pieces of information about a time at which the application or content is used, a user's preference for the application or content, a frequency of use of the application or content, and information regarding the content sharing with other users.

Also, the information regarding the status of the mobile communication terminal 100 or information on the environment and surroundings thereof may include one or more pieces of location information regarding a location of the mobile communication terminal 100, recognition information regarding a physical movement thereof, sound input information, temperature information, image information, illumination information, and information regarding a horizontal angle and atmospheric pressure thereof.

The location information may include information indicating the location of the mobile communication terminal 100, such as cell-ID information, Wi-Fi access point (AP) information, and GPS coordinate information.

The recognition information regarding the physical movement of the mobile communication terminal 100 may include information regarding a movement thereof such as shaking, vibration, etc. recognized by using a gravity sensor, an acceleration sensor, etc. embedded in the mobile communication terminal 100.

The sound input information may include information regarding sound from surroundings of the mobile communication terminal 100, which is received using a microphone, etc.

The temperature information may include information regarding a temperature that may be sensed by the mobile communication terminal 100 by using a temperature sensor embedded in the mobile communication terminal 100. The image information may include information regarding an image captured using a camera embedded in the mobile communication terminal 100.

The illumination information may include information regarding the illumination of light from surroundings of the mobile communication terminal 100 that is sensed using the camera or an illumination sensor embedded in the mobile communication terminal 100. The horizontal angle of the mobile communication terminal 100 means an angle formed between the mobile communication terminal 100 and a horizontal plane.

The information regarding the atmospheric pressure may include information regarding an atmospheric pressure of surroundings of the mobile communication terminal 100, which is measured by the mobile communication terminal 100.

To obtain the information described above, at least one of an acceleration sensor, an image sensor, a sound sensor, a temperature sensor, a gravity sensor, a location sensor, and a barometer may be used.

Furthermore, the information regarding the terminal status of the mobile communication terminal 100 or information on the environment and surroundings of the mobile communication terminal 100 may include information regarding an application or content that is being currently used in the mobile communication terminal 100.

The information regarding the status of the mobile communication terminal 100 or information on the environment and surroundings of the mobile communication terminal 100 may also include information regarding settings of the mobile communication terminal 100. For example, the information may include information regarding settings of the mobile communication terminal 100, such as a sleep mode to minimize use of a processor of the mobile communication terminal 100 and reduce power consumption of the mobile communication terminal 100 or an input mode of a keypad.

The information regarding the status of the mobile communication terminal 100 or information on the environment and surroundings of the mobile communication terminal 100 may also include information regarding a user of the mobile communication terminal 100, such as the user's age, sex, job, etc. The obtained information regarding the terminal status may be accumulated and stored in the terminal status storage unit 120.

Thereafter, a connection status of the mobile communication terminal 100 and the connection device 135 is determined (operation S220). The connection status of the mobile communication terminal 100 and the connection device 135 includes at least one of whether the mobile communication terminal 100 and the connection device 135 are connected to each other, a type of the connection device 135 connected to the mobile communication terminal 100, and a connection method of the mobile communication terminal 100 and the connection device 135.

In a case where the connection status changes since the mobile communication terminal 100 and the connection device 135 are connected to each other or are disconnected from each other, an application or content corresponding to the connection status of the mobile communication terminal 100 and the information regarding the terminal status is selected (operation S230). If the application is selected, the recommended target executing unit 140 executes the application, and, if the content is selected, the recommended target executing unit 140 executes an application used to execute the content based on the executed application (operation S240).

FIG. 3 is a table illustrating accumulated and stored information regarding an application or content executed according to information regarding a connection status of the connection device 135 or a terminal status of the mobile communication terminal 100, according to an exemplary embodiment.

Referring to FIG. 3, information regarding the terminal status and the executed application or content may be stored in the terminal status storage unit 120. Also, in a case where the stored information includes an application or content that is repeatedly used in the terminal status of the mobile communication terminal 100, if the connection device 135 is connected to the mobile communication terminal 100 in the corresponding terminal status, the repeatedly used application or content may be executed.

Although not shown, the information stored in the terminal status storage unit 120 may include information regarding the connection status of the connection device 135. For example, as shown in FIG. 3, in a case where information regarding a repeatedly executed application A, by connection of the connection device 135 to the mobile communication terminal 100, is accumulated and stored when location information is (xx, xx), motion recognition information is XYZ, and a temperature is 25° C. at times 1, 3, and 5, the connection device 135 may be connected to the mobile communication terminal 100, and the application A may be executed.

Figure 4:
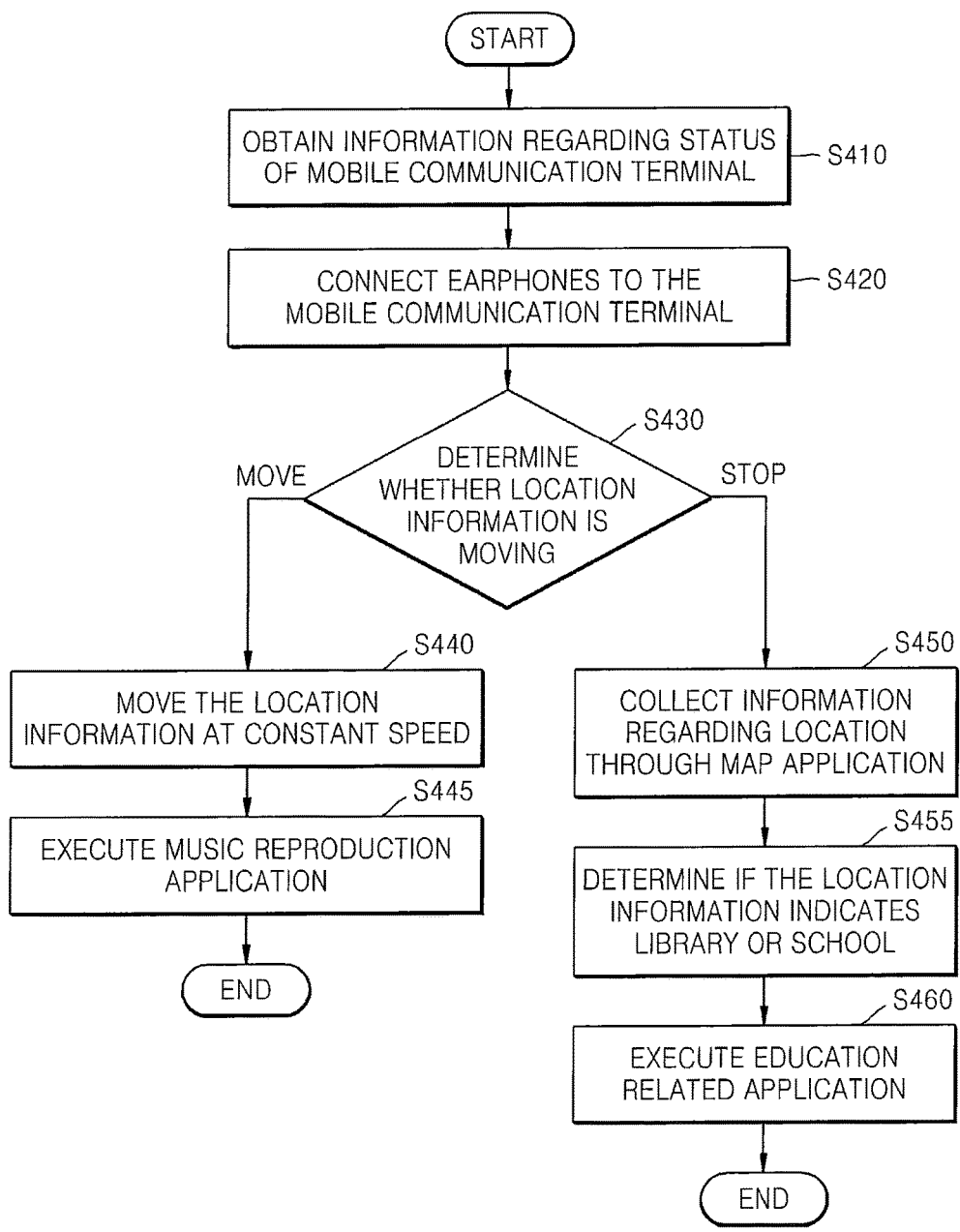
FIG. 4 is a flowchart illustrating a method of executing a recommended application when earphones are connected to a mobile communication terminal, according to an exemplary embodiment.

FIG. 4 is a flowchart illustrating a method of executing a recommended application when earphones, which is the connection device 135, are connected to the mobile communication terminal 100, according to an exemplary embodiment.

Information regarding a terminal status of the mobile communication terminal 100 is obtained (operation S410). In this regard, the information regarding the terminal status may include location information of the mobile communication terminal 100.

Thereafter, if the earphones are connected to the mobile communication terminal 100 (operation S420), it may be determined whether the location information indicates movement by analyzing the location information of the mobile communication terminal 100 (operation S430). The recommended application to be executed may be selected from applications corresponding to the connection of the earphones provided according to a result of the determination.

For example, applications corresponding to the connection of the earphones may include a music reproduction application, a video reproduction application, an exercise related application, an education related application, and the like.

Next, if the location information indicates movement (operation S440), the music reproduction application may be executed to reproduce a music file (operation S445). For example, in a case where the location information indicates movement at a speed of 2 km and 10 km an hour, the music reproduction application may be executed to reproduce a music file having a slow beat, and, in a case where the location information indicates movement at a speed of 10 km and 20 km an hour, the music reproduction application may be executed to reproduce a music file having a fast beat suitable for a user who is doing exercise.

Furthermore, in a case where the location information indicates movement has stopped, a map related application may be executed or information regarding a location where the mobile communication terminal 100 stops moving may be collected from a database (operation S450). In a case where the location information stops moving at a place that is determined as a school or a library (operation S455), an education related application may be executed (operation S460).

In this regard, in a case where information regarding an application or content executed at a specific moving speed or at the place where the location information indicates movement has stopped is accumulated and stored in the terminal status storage unit 120, the application to be executed may be selected from the information. For example, even if it is not determined that the particular place where the location information stops moving is a school, in a case where the earphones are connected to the mobile communication terminal 100 at the particular place, and information regarding an education related application that is repeatedly executed is stored in the terminal status storage unit 120, the earphones may be connected to the mobile communication terminal 100 at the particular place to execute the education related application.

Figure 5:
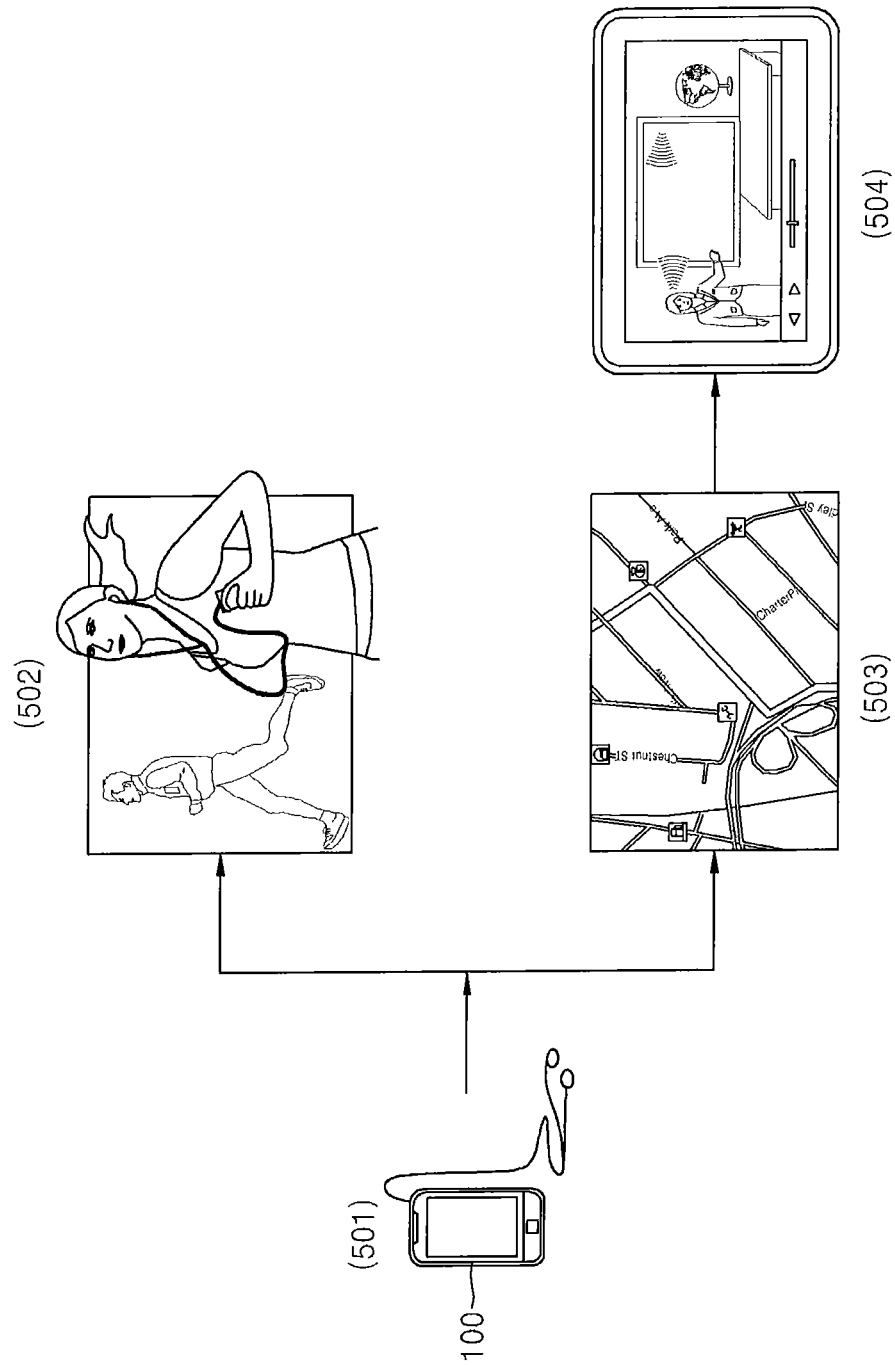
FIG. 5 illustrates an example of executing an application by using the method of FIG. 4 when earphones are connected to a mobile communication terminal.

FIG. 5 illustrates an example of executing an application or content by using the method of FIG. 4.

As shown in FIG. 5, when earplugs are connected to a mobile communication terminal 100 (501), if location information indicates movement at a certain speed, then a music reproduction application can be executed (502). If location information indicates that movement has stopped in a location which is a school or library (503), then an education related application may be executed (504).

Figure 6:
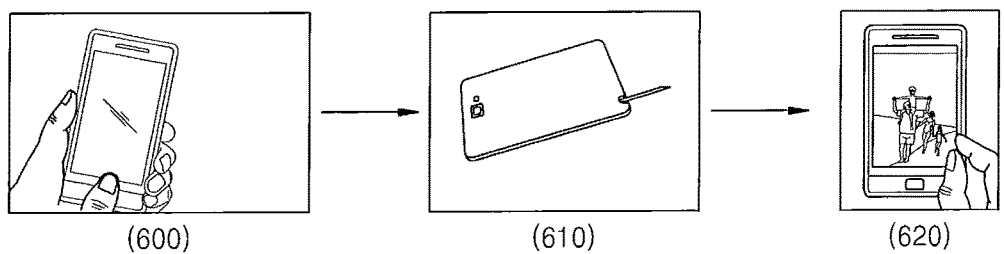
FIG. 6 illustrates an example of executing an application when an electronic pen is taken out of a mobile communication terminal after an image is captured by using the mobile communication terminal.
Figure 7:
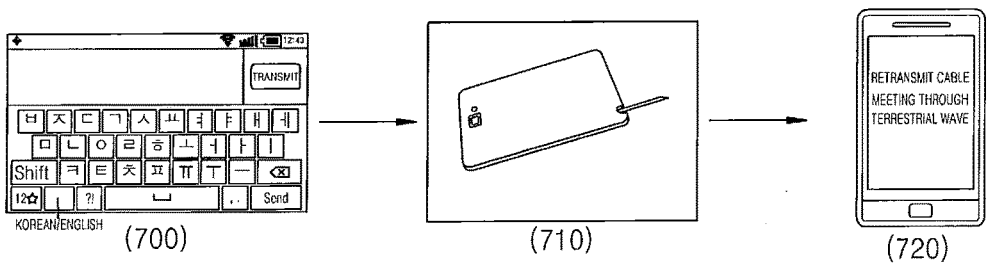
FIG. 7 illustrates an example of changing an input mode of a key pad when an electronic pen is taken out of a mobile communication terminal during an input mode.
Figure 8:
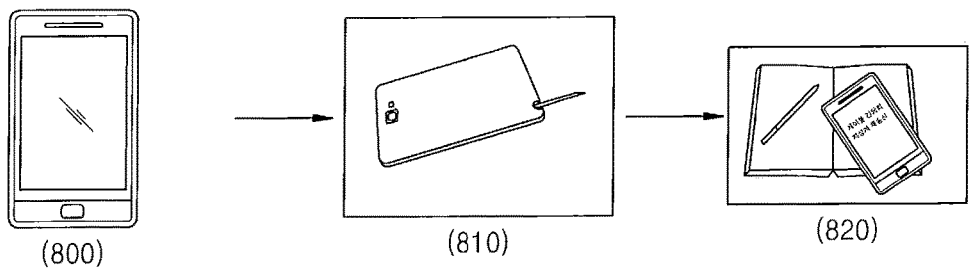
FIG. 8 illustrates an example of executing a memo related application when an electronic pen is taken out of a mobile communication terminal.

FIGS. 6 through 8 illustrates examples of executing an application or content by sensing that an electronic pen is taken out of the mobile communication terminal 100 when the electronic pen is taken out of the mobile communication terminal 100.

Referring to FIG. 6, after an image is captured by using the mobile communication terminal 100 (600), when it is sensed that the electronic pen is taken out of the mobile communication terminal 100 (610), the mobile communication terminal 100 may execute an application for editing the captured image (620).

Referring to FIG. 7, when the mobile communication terminal 100 is set in an input mode of a key pad (700), and it is sensed that the electronic pen is taken out of the mobile communication terminal 100 (710), the mobile communication terminal 100 may be changed to a cursive input mode (720).

Referring to FIG. 8, when the mobile communication terminal 100 is set in a sleep mode, which is a power saving mode (800), and it is sensed that the electronic pen is taken out of the mobile communication terminal 100 (810), the mobile communication terminal 100 may be released from the sleep mode and may execute an application most frequently used when the electronic pen is taken out of the mobile communication terminal 100 (820).

FIG. 9 illustrates another example of executing a recommended application when the mobile communication terminal 100 is connected to a holder 901 that is the connection device 135.

In a case where the mobile communication terminal 100 is connected to the holder, the recommended application may be determined based on time, location, and motion information. Referring to FIG. 9, in a case where the mobile communication terminal 100 is connected to the holder 901 in a house of a user of the mobile communication terminal 100 (902), a sleep check related application may be executed (903), and, in a case where the mobile communication terminal 100 is being moved while on the road during the daytime, and vibration of the mobile communication terminal 100 is sensed (904), a driving related application may be executed (905).

While exemplary embodiments have been particularly shown and described, it will be understood by those of ordinary skill in the art that various changes in form and details may be made therein without departing from the spirit and scope of the inventive concept as defined by the following claims.

The above described processes can be executed by a computer readable recording medium having recorded thereon a computer program.

What is claimed is:

1. A mobile communication terminal comprising:
   a memory for storing information of a plurality of applications previously executed in the mobile communication terminal, information regarding a terminal status of the mobile communication terminal when each of the plurality of applications was previously executed in the mobile communication terminal, and information regarding a connection status of a connection device and the mobile communication terminal when each of the plurality of applications was previously executed in the mobile communication terminal; and
   at least one processor configured to:
   determine a connection status of the connection device and the mobile communication terminal, the determined connection status comprising information regarding whether the connection device and the mobile communication terminal are connected to each other,
   obtain information regarding a terminal status of the mobile communication terminal, wherein the terminal status comprises information regarding an application that is being executed or previously executed in the mobile communication terminal and information regarding an operation mode of the mobile communication terminal,
   determine a recommended application, among the plurality of applications being executed or previously executed in the mobile communication terminal, corresponding to the determined connection status as the connection device is connected to the mobile communication terminal and the obtained information regarding the terminal status of the mobile communication terminal, based on the stored information regarding the connection status of the connection device and the mobile communication terminal and the stored information regarding the terminal status of the mobile communication terminal, the recommended application being based on the operation mode of the mobile communication terminal, and
   execute the recommended application,
   wherein the stored information of the plurality of applications includes information of a first application which was repeatedly executed in the mobile communication terminal at a location of the mobile communication terminal and information of a second application which was executed in the mobile communication terminal while the mobile communication terminal was moving, and the stored information regarding the terminal status includes information regarding the location of the mobile communication terminal, and
   wherein the processor is further configured,
   to obtain a location information of the mobile communication terminal;
   in response to the obtained location information indicating stopping of the mobile communication terminal at the location, to determine the first application among the plurality of applications based on the stored information of the first application and the stored information regarding the location of the mobile communication terminal, and to execute the first application; and in response to the obtained location information indicating movement of the mobile communication terminal, to determine the second application among the plurality of applications based on the stored information of the second application, and to execute the second application.

2. The mobile communication terminal of claim 1, wherein the determined connection status further comprises at least one of a type of the connection device connected to the mobile communication terminal, and a connection method connecting the mobile communication terminal with the connection device.

3. The mobile communication terminal of claim 1, wherein the processor is further configured to confirm and store the terminal status of the mobile communication terminal by using at least one of a movement recognition sensor, an image sensor, a sound sensor, a touch sensor, a temperature sensor, a gravity sensor, and a location sensor, and
wherein the obtained information regarding the terminal status comprises at least one of a current time, an image received by the mobile communication terminal through the image sensor, a temperature of the mobile communication terminal measured through the temperature sensor, sound received by the mobile communication terminal, information regarding the location of the mobile communication terminal, illumination of the location of the mobile communication terminal, an angle formed between the mobile communication terminal and a horizontal plane, an application currently being used in the mobile communication terminal, a current status of the mobile communication terminal being used, and user information.

4. The mobile communication terminal of claim 1, wherein the processor is further configured to provide a server with information regarding the determined connection status and the obtained information regarding the terminal status, receive recommended application identification information from the server, and determine the recommended application.

5. The mobile communication terminal of claim 4, wherein the processor is further configured to provide the server with a list of applications installed in the mobile communication terminal,
wherein the recommended application comprises at least one of the applications included in the list.

6. The mobile communication terminal of claim 1, wherein the connection device and the mobile communication terminal are connected to each other through a wireless communication.

7. The mobile communication terminal of claim 1, wherein if the determined connection status and the obtained information regarding the terminal status of the mobile communication terminal correspond to a plurality of recommended applications, the processor is further configured to output a list of the plurality of recommended applications, receive a selection from the output list of the plurality of recommended applications, and determine the recommended application.

8. The mobile communication terminal of claim 1, wherein the connection device is a pen used as an input device,
wherein the determined connection status indicates whether the pen used as the input device is connected to the mobile communication terminal.

9. The mobile communication terminal of claim 8, wherein, if the information regarding the application that is being executed in the mobile communication terminal is an application relating to image capture, and if the pen used as the input device is disconnected from the mobile communication terminal, the processor is further configured to execute an application for editing a captured image.

10. The mobile communication terminal of claim 8, wherein, when the operation mode of the mobile communication terminal is a keypad input mode, if the pen used as the input device is disconnected from the mobile communication terminal, the processor is further configured to change the keypad input mode to a cursive input mode by using the pen and execute an application for writing in cursive.

11. The mobile communication terminal of claim 8, wherein, when the operation mode of the mobile communication terminal is a sleep mode, if the pen used as the input device is disconnected from the mobile communication terminal, the processor is further configured to determine the sleep mode and determine and execute the recommended application.

12. A method of recommending an application in a mobile communication terminal, the method comprising:
storing information of a plurality of applications previously executed in the mobile communication terminal, information regarding a terminal status of the mobile communication terminal when each of the plurality of applications was previously executed in the mobile communication terminal, and information regarding a connection status of a connection device and the mobile communication terminal when each of the plurality of applications was previously executed in the mobile communication terminal;
determining a connection status of the connection device and the mobile communication terminal, wherein the determined connection status comprises information regarding whether the mobile communication terminal and the connection device are connected to each other;
obtaining information regarding a terminal status of the mobile communication terminal, wherein the terminal status comprises information regarding an application that is being executed or previously executed in the mobile communication terminal and information regarding an operation mode of the mobile communication terminal;
determining a recommended application, among the plurality of applications being executed or previously executed in the mobile communication terminal, corresponding to the determined connection status as the connection device is connected to the mobile communication terminal and the obtained information regarding the terminal status of the mobile communication terminal, based on the stored information regarding the terminal status of the mobile communication terminal and the stored information regarding the connection status of the connection device and the mobile communication terminal, the recommended application being based on the o operation mode of the mobile communication terminal; and
executing the recommended application,
wherein the stored information of the plurality of applications includes information of a first application which was repeatedly executed in the mobile communication terminal at a location of the mobile communication terminal and information of a second application which was executed in the mobile communication terminal while the mobile communication terminal was moving, and the stored information regarding the terminal status includes information regarding the location of the mobile communication terminal, wherein the method further comprises obtaining a location information of the mobile communication terminal, wherein in response to the obtained location information indicating stopping of the mobile communication terminal at the location, the first application among the plurality of applications is determined based on the stored information of the first application and the stored information regarding the location of the mobile communication terminal, and the first application is executed, and wherein in response to the obtained location information indicating movement of the mobile communication terminal, the second application among the plurality of applications is determined based on the stored information of the second application, and the second application is executed.

13. The method of claim 12, wherein the determined connection status further comprises at least one of a type of the connection device connected to the mobile communication terminal, and a connection method connecting the mobile communication terminal with the connection device.

14. The method of claim 12, wherein the obtaining the information regarding the terminal status of the mobile communication terminal comprises: confirming the terminal status of the mobile communication terminal by using at least one of a movement recognition sensor, an image sensor, a sound sensor, a touch sensor, a temperature sensor, a gravity sensor, and a location sensor, and wherein the obtained information regarding the terminal status comprises at least one of a current time, an image received by the mobile communication terminal through the image sensor, a temperature of the mobile communication terminal measured through the temperature sensor, sound received by the mobile communication terminal, information regarding the location of the mobile communication terminal, illumination of the location of the mobile communication terminal, an angle formed between the mobile communication terminal and a horizontal plane, an application currently being used in the mobile communication terminal, a current status of the mobile communication terminal being used, and user information.

15. The method of claim 12, further comprising:

providing a server with information regarding the determined connection status and the obtained information regarding the terminal status; and receiving identification information of the recommended application from the server;

wherein, in the determining and executing of the recommended application, the recommended application is determined and executed based on identification information of the recommended application received from the server.

16. The method of claim 15, further comprising:

providing the server with a list of applications installed in the mobile communication terminal, wherein, in the determining and executing the recommended application, the recommended application comprises at least one of the applications included in the list.

17. The method of claim 12, wherein, in a case where information regarding the determined connection status and the obtained information regarding the terminal status of the mobile communication terminal correspond to a plurality of recommended applications, the determining and executing the recommended application comprises outputting a list of the plurality of recommended applications, receiving a selection from the output list of the plurality of recommended applications, and determining the recommended application.

18. A non-transitory computer readable recording medium having recorded thereon a computer program for executing a method of recommending an application in a mobile communication terminal, the method comprising:

storing information of a plurality of applications previously executed in the mobile communication terminal, information regarding a terminal status of the mobile communication terminal when each of the plurality of applications was previously executed in the mobile communication terminal and information regarding a connection status of a connection device and the mobile communication terminal when each of the plurality of applications was previously executed in the mobile communication terminal;

determining a connection status of the connection device and the mobile communication terminal, wherein the determined connection status comprises information regarding whether the mobile communication terminal and the connection device are connected to each other;

obtaining information regarding a terminal status of the mobile communication terminal, wherein the terminal status comprises information regarding an application that is being executed or previously executed in the mobile communication terminal and information regarding an operation mode of the mobile communication terminal;

determining a recommended application, among the plurality of applications being executed or previously executed in the mobile communication terminal, corresponding to the determined connection status as the connection device is connected to the mobile communication terminal and the obtained information regarding the terminal status of the mobile communication terminal, based on the stored information regarding the terminal status of the mobile communication terminal and the stored information regarding the connection status of the connection device and the mobile communication terminal, the recommended application being based on the operation mode of the mobile communication terminal; and executing the recommended application, wherein the stored information of the plurality of applications includes information of a first application which was repeatedly executed in the mobile communication terminal at a location of the mobile communication terminal and information of a second application which was executed in the mobile communication terminal while the mobile communication terminal was moving, and the stored information regarding the terminal status includes information regarding the location of the mobile communication terminal, wherein the method further comprises obtaining a location information of the mobile communication terminal, wherein in response to the obtained location information indicating stopping of the mobile communication terminal at the location, the first application among the plurality of applications is determined based on the stored information of the first application and the stored information regarding the location of the mobile communication terminal, and the first application is executed, and wherein in response to the obtained location information indicating movement of the mobile communication terminal, the second application among the plurality of applications is determined based on the stored information of the second application, and the second application is executed.

* * * * *

UNITED STATES PATENT AND TRADEMARK OFFICE
CERTIFICATE OF CORRECTION

PATENT NO. : 10,225,704 B2
APPLICATION NO. : 13/610154
DATED : March 5, 2019
INVENTOR(S) : Sang-ok Cha et al.

It is certified that error appears in the above-identified patent and that said Letters Patent is hereby corrected as shown below:

In the Claims

Column 14, Line 8, Claim 1:
Delete "A mobile communication terminal" and insert --"An electronic device"-- therefor Column 14, Lines 10-11, Claim 1:
Delete "mobile communication terminal" and insert --"electronic device"-- therefor Column 14, Line 11, Claim 1:
Delete "terminal status" and insert --"device status"-- therefor Column 14, Line 12, Claim 1:
Delete "mobile communication terminal" and insert --"electronic device"-- therefor Column 14, Line 14, Claim 1:
Delete "mobile communication terminal" and insert --"electronic device"-- therefor Column 14, Line 16, Claim 1:
Delete "mobile communication terminal" and insert --"electronic device"-- therefor Column 14, Line 18, Claim 1:
Delete "mobile communication terminal" and insert --"electronic device"-- therefor Column 14, Line 20, Claim 1:
Delete "a connection" and insert --"the connection"-- therefor Column 14, Line 21, Claim 1:
Delete "mobile communication terminal" and insert --"electronic device"-- therefor Signed and Sealed this
Thirtieth Day of April, 2019

Andrei Iancu
*Director of the United States Patent and Trademark Office*

Column 14, Line 24, Claim 1:
Delete "mobile communication terminal" and insert --"electronic device"-- therefor Column 14, Line 26, Claim 1:
Delete "a terminal status" and insert --"the device status"-- therefor Column 14, Line 27, Claim 1:
Delete "mobile communication terminal" and insert --"electronic device"-- therefor Column 14, Lines 27-28, Claim 1:
Delete "terminal status" and insert --"device status"-- therefor Column 14, Line 30, Claim 1:
Delete "mobile communication terminal" and insert --"electronic device"-- therefor Column 14, Lines 31-32, Claim 1:
Delete "mobile communication terminal" and insert --"electronic device"-- therefor Column 14, Line 35, Claim 1:
Delete "mobile communication terminal" and insert --"electronic device"-- therefor Column 14, Lines 37-38, Claim 1:
Delete "mobile communication terminal" and insert --"electronic device"-- therefor Column 14, Line 39, Claim 1:
Delete "terminal status" and insert --"device status"-- therefor Column 14, Lines 39-40, Claim 1:
Delete "mobile communication terminal" and insert --"electronic device"-- therefor Column 14, Line 42, Claim 1:
Delete "mobile communication terminal" and insert --"electronic device"-- therefor Column 14, Line 43, Claim 1:
Delete "terminal status" and insert --"device status"-- therefor Column 14, Lines 43-44, Claim 1:
Delete "mobile communication terminal" and insert --"electronic device"-- therefor Column 14, Lines 45-46, Claim 1:
Delete "mobile communication terminal" and insert --"electronic device"-- therefor Column 14, Lines 50-51, Claim 1:
Delete "mobile communication terminal" and insert --"electronic device"-- therefor Column 14, Lines 51-52, Claim 1:
Delete "mobile communication terminal" and insert --"electronic device"-- therefor Column 14, Line 53, Claim 1:
Delete "mobile communication terminal" and insert --"electronic device"-- therefor Column 14, Line 54, Claim 1:
Delete "mobile communication terminal" and insert --"electronic device"-- therefor Column 14, Line 55, Claim 1:
Delete "terminal status" and insert --"device status"-- therefor Column 14, Line 57, Claim 1:
Delete "mobile communication terminal" and insert --"electronic device"-- therefor Column 14, Lines 59-60, Claim 1:
Delete "mobile communication terminal" and insert --"electronic device"-- therefor Column 14, Line 62, Claim 1:
Delete "mobile communication terminal" and insert --"electronic device"-- therefor Column 14, Lines 66-67, Claim 1:
Delete "mobile communication terminal" and insert --"electronic device"-- therefor Column 15, Line 2, Claim 1:
Delete "mobile communication terminal" and insert --"electronic device"-- therefor Column 15, Line 7, Claim 2:
Delete "mobile communication terminal" and insert --"electronic device"-- therefor Column 15, Line 10, Claim 2:
Delete "mobile communication terminal" and insert --"electronic device"-- therefor Column 15, Line 11, Claim 2:
Delete "mobile communication terminal" and insert --"electronic device"-- therefor Column 15, Line 13, Claim 3:
Delete "mobile communication terminal" and insert --"electronic device"-- therefor Column 15, Line 15, Claim 3:
Delete "terminal status" and insert --"device status"-- therefor Column 15, Lines 15-16, Claim 3:
Delete "mobile communication terminal" and insert --"electronic device"-- therefor Column 15, Lines 20-21, Claim 3:
Delete "terminal status" and insert --"device status"-- therefor Column 15, Line 22, Claim 3:
Delete "mobile communication terminal" and insert --"electronic device"-- therefor Column 15, Lines 23-24, Claim 3:
Delete "mobile communication terminal" and insert --"electronic device"-- therefor Column 15, Lines 25-26, Claim 3:
Delete "mobile communication terminal" and insert --"electronic device"-- therefor Column 15, Line 27, Claim 3:
Delete "mobile communication terminal" and insert --"electronic device"-- therefor Column 15, Line 28, Claim 3:
Delete "mobile communication terminal" and insert --"electronic device"-- therefor Column 15, Lines 29-30, Claim 3:
Delete "mobile communication terminal" and insert --"electronic device"-- therefor Column 15, Line 31, Claim 3:
Delete "mobile communication terminal" and insert --"electronic device"-- therefor Column 15, Line 32, Claim 3:
Delete "mobile communication terminal" and insert --"electronic device"-- therefor Column 15, Line 34, Claim 4:
Delete "mobile communication terminal" and insert --"electronic device"-- therefor Column 15, Lines 37-38, Claim 4:
Delete "terminal status" and insert --"device status"-- therefor Column 15, Line 41, Claim 5:
Delete "mobile communication terminal" and insert --"electronic device"-- therefor Column 15, Lines 43-44, Claim 5:
Delete "mobile communication terminal" and insert --"electronic device"-- therefor Column 15, Line 47, Claim 6:
Delete "mobile communication terminal" and insert --"electronic device"-- therefor Column 15, Lines 48-49, Claim 6:
Delete "mobile communication terminal" and insert --"electronic device"-- therefor Column 15, Line 51, Claim 7:
Delete "mobile communication terminal" and insert --"electronic device"-- therefor Column 15, Line 53, Claim 7:
Delete "terminal status" and insert --"device status"-- therefor Column 15, Lines 53-54, Claim 7:
Delete "mobile communication terminal" and insert --"electronic device"-- therefor Column 15, Line 60, Claim 8:
Delete "mobile communication terminal" and insert --"electronic device"-- therefor Column 15, Line 65, Claim 8:
Delete "mobile communication terminal" and insert --"electronic device"-- therefor Column 15, Line 66, Claim 9:
Delete "mobile communication terminal" and insert --"electronic device"-- therefor Column 16, Line 1, Claim 9:
Delete "mobile communication terminal" and insert --"electronic device"-- therefor Column 16, Lines 3-4, Claim 9:
Delete "mobile communication terminal" and insert --"electronic device"-- therefor Column 16, Line 6, Claim 10:
Delete "mobile communication terminal" and insert --"electronic device"-- therefor Column 16, Lines 7-8, Claim 10:
Delete "mobile communication terminal" and insert --"electronic device"-- therefor Column 16, Lines 9-10, Claim 10:
Delete "mobile communication terminal" and insert --"electronic device"-- therefor Column 16, Line 14, Claim 11:
Delete "mobile communication terminal" and insert --"electronic device"-- therefor Column 16, Lines 15-16, Claim 11:
Delete "mobile communication terminal" and insert --"electronic device"-- therefor Column 16, Lines 17-18, Claim 11:
Delete "mobile communication terminal" and insert --"electronic device"-- therefor Column 16, Lines 21-22, Claim 12:
Delete "a mobile communication terminal" and insert --"an electronic device"-- therefor Column 16, Line 24, Claim 12:
Delete "mobile communication terminal" and insert --"electronic device"-- therefor Column 16, Line 25, Claim 12:
Delete "terminal status" and insert --"device status"-- therefor Column 16, Lines 25-26, Claim 12:
Delete "mobile communication terminal" and insert --"electronic device"-- therefor Column 16, Lines 27-28, Claim 12:
Delete "mobile communication terminal" and insert --"electronic device"-- therefor Column 16, Lines 29-30, Claim 12:
Delete "mobile communication terminal" and insert --"electronic device"-- therefor Column 16, Lines 31-32, Claim 12:
Delete "mobile communication terminal" and insert --"electronic device"-- therefor Column 16, Line 33, Claim 12:
Delete "a connection" and insert --"the connection"-- therefor Column 16, Line 34, Claim 12:
Delete "mobile communication terminal" and insert --"electronic device"-- therefor Column 16, Line 36, Claim 12:
Delete "mobile communication terminal" and insert --"electronic device"-- therefor Column 16, Line 38, Claim 12:
Delete "terminal status" and insert --"device status"-- therefor Column 16, Line 39, Claim 12:
Delete "mobile communication terminal" and insert --"electronic device"-- therefor Column 16, Lines 39-40, Claim 12:
Delete "terminal status" and insert --"device status"-- therefor Column 16, Line 42, Claim 12:
Delete "mobile communication terminal" and insert --"electronic device"-- therefor Column 16, Lines 43-44, Claim 12:
Delete "mobile communication terminal" and insert --"electronic device"-- therefor Column 16, Line 47, Claim 12:
Delete "mobile communication terminal" and insert --"electronic device"-- therefor Column 16, Lines 49-50, Claim 12:
Delete "mobile communication terminal" and insert --"electronic device"-- therefor Column 16, Line 51, Claim 12:
Delete "terminal status" and insert --"device status"-- therefor Column 16, Lines 51-52, Claim 12:
Delete "mobile communication terminal" and insert --"electronic device"-- therefor Column 16, Line 53, Claim 12:
Delete "terminal status" and insert --"device status"-- therefor Column 16, Line 53, Claim 12:
Delete "mobile communication terminal" and insert --"electronic device"-- therefor Column 16, Lines 55-56, Claim 12:
Delete "mobile communication terminal" and insert --"electronic device"-- therefor Column 16, Lines 57-58, Claim 12:
Delete "mobile communication terminal" and insert --"electronic device"-- therefor Column 16, Lines 62-63, Claim 12:
Delete "mobile communication terminal" and insert --"electronic device"-- therefor Column 16, Lines 63-64, Claim 12:
Delete "mobile communication terminal" and insert --"electronic device"-- therefor Column 16, Line 65, Claim 12:
Delete "mobile communication terminal" and insert --"electronic device"-- therefor Column 16, Line 66, Claim 12:
Delete "mobile communication terminal" and insert --"electronic device"-- therefor Column 16, Line 67, Claim 12:
Delete "terminal status" and insert --"device status"-- therefor Column 17, Line 2, Claim 12:
Delete "mobile communication terminal" and insert --"electronic device"-- therefor Column 17, Lines 4-5, Claim 12:
Delete "mobile communication terminal" and insert --"electronic device"-- therefor Column 17, Lines 7-8, Claim 12:
Delete "mobile communication terminal" and insert --"electronic device"-- therefor Column 17, Lines 11-12, Claim 12:
Delete "mobile communication terminal" and insert --"electronic device"-- therefor Column 17, Lines 15-16, Claim 12:
Delete "mobile communication terminal" and insert --"electronic device"-- therefor Column 17, Lines 22-23, Claim 13:
Delete "mobile communication terminal" and insert --"electronic device"-- therefor Column 17, Line 24, Claim 13:
Delete "mobile communication terminal" and insert --"electronic device"-- therefor Column 17, Line 26, Claim 14:
Delete "terminal status" and insert --"device status"-- therefor Column 17, Lines 26-27, Claim 14:
Delete "mobile communication terminal" and insert --"electronic device"-- therefor Column 17, Lines 27-28, Claim 14:
Delete "terminal status" and insert --"device status"-- therefor Column 17, Line 28, Claim 14:
Delete "mobile communication terminal" and insert --"electronic device"-- therefor Column 17, Lines 32-33, Claim 14:
Delete "terminal status" and insert --"device status"-- therefor Column 17, Line 34, Claim 14:
Delete "mobile communication terminal" and insert --"electronic device"-- therefor Column 17, Lines 35-36, Claim 14:
Delete "mobile communication terminal" and insert --"electronic device"-- therefor Column 17, Lines 37-38, Claim 14:
Delete "mobile communication terminal" and insert --"electronic device"-- therefor Column 17, Line 39, Claim 14:
Delete "mobile communication terminal" and insert --"electronic device"-- therefor Column 17, Line 40, Claim 14:
Delete "mobile communication terminal" and insert --"electronic device"-- therefor Column 17, Lines 41-42, Claim 14:
Delete "mobile communication terminal" and insert --"electronic device"-- therefor Column 17, Line 43, Claim 14:
Delete "mobile communication terminal" and insert --"electronic device"-- therefor Column 17, Line 44, Claim 14:
Delete "mobile communication terminal" and insert --"electronic device"-- therefor Column 17, Line 49, Claim 15:
Delete "terminal status" and insert --"device status"-- therefor Column 17, Line 59, Claim 16:
Delete "mobile communication terminal" and insert --"electronic device"-- therefor Column 17, Line 66, Claim 17:
Delete "terminal status" and insert --"device status"-- therefor Column 17, Line 67, Claim 17:
Delete "mobile communication terminal" and insert --"electronic device"-- therefor Column 18, Lines 9-10, Claim 18:
Delete "a mobile communication terminal" and insert --"an electronic device"-- therefor Column 18, Line 12, Claim 18:
Delete "mobile communication terminal" and insert --"electronic device"-- therefor Column 18, Line 13, Claim 18:
Delete "terminal status" and insert --"device status"-- therefor Column 18, Lines 13-14, Claim 18:
Delete "mobile communication terminal" and insert --"electronic device"-- therefor Column 18, Lines 15-16, Claim 18:
Delete "mobile communication terminal" and insert --"electronic device"-- therefor Column 18, Lines 17-18, Claim 18:
Delete "mobile communication terminal" and insert --"electronic device"-- therefor Column 18, Lines 19-20, Claim 18:
Delete "mobile communication terminal" and insert --"electronic device"-- therefor Column 18, Line 21, Claim 18:
Delete "a connection" and insert --"the connection"-- therefor Column 18, Line 22, Claim 18:
Delete "mobile communication terminal" and insert --"electronic device"-- therefor Column 18, Line 24, Claim 18:
Delete "mobile communication terminal" and insert --"electronic device"-- therefor Column 18, Line 26, Claim 18:
Delete "terminal status" and insert --"device status"-- therefor Column 18, Line 27, Claim 18:
Delete "mobile communication terminal" and insert --"electronic device"-- therefor Column 18, Lines 27-28, Claim 18:
Delete "terminal status" and insert --"device status"-- therefor Column 18, Line 30, Claim 18:
Delete "mobile communication terminal" and insert --"electronic device"-- therefor Column 18, Lines 31-32, Claim 18:
Delete "mobile communication terminal" and insert --"electronic device"-- therefor Column 18, Line 35, Claim 18:
Delete "mobile communication terminal" and insert --"electronic device"-- therefor Column 18, Lines 37-38, Claim 18:
Delete "mobile communication terminal" and insert --"electronic device"-- therefor Column 18, Line 39, Claim 18:
Delete "terminal status" and insert --"device status"-- therefor Column 18, Lines 39-40, Claim 18:
Delete "mobile communication terminal" and insert --"electronic device"-- therefor Column 18, Line 41, Claim 18:
Delete "terminal status" and insert --"device status"-- therefor Column 18, Line 41, Claim 18:
Delete "mobile communication terminal" and insert --"electronic device"-- therefor Column 18, Lines 43-44, Claim 18:
Delete "mobile communication terminal" and insert --"electronic device"-- therefor Column 18, Lines 45-46, Claim 18:
Delete "mobile communication terminal" and insert --"electronic device"-- therefor Column 18, Lines 50-51, Claim 18:
Delete "mobile communication terminal" and insert --"electronic device"-- therefor

CERTIFICATE OF CORRECTION (continued)
U.S. Pat. No. 10,225,704 B2

Column 18, Lines 51-52, Claim 18:
Delete "mobile communication terminal" and insert --"electronic device"-- therefor Column 18, Line 53, Claim 18:
Delete "mobile communication terminal" and insert --"electronic device"-- therefor Column 18, Line 54, Claim 18:
Delete "mobile communication terminal" and insert --"electronic device"-- therefor Column 18, Line 55, Claim 18:
Delete "terminal status" and insert --"device status"-- therefor Column 18, Line 57, Claim 18:
Delete "mobile communication terminal" and insert --"electronic device"-- therefor Column 18, Lines 59-60, Claim 18:
Delete "mobile communication terminal" and insert --"electronic device"-- therefor Column 18, Lines 62-63, Claim 18:
Delete "mobile communication terminal" and insert --"electronic device"-- therefor Column 19, Lines 1-2, Claim 18:
Delete "mobile communication terminal" and insert --"electronic device"-- therefor Column 19, Lines 5-6, Claim 18:
Delete "mobile communication terminal" and insert --"electronic device"-- therefor